Patented Sept. 10, 1940

2,214,557

UNITED STATES PATENT OFFICE 2,214,557

METHOD OF PRODUCING MAGNESIUM

Roy C. Kirk, Midland, Mich., assignor to The Dow Chemical Company, Midland, Mich., a corporation of Michigan No Drawing. Application July 26, 1939,
Serial No. 286,585

6 Claims. (Cl. 75—67)

This invention relates to a method of producing magnesium by the thermal reduction of magnesia-containing materials.

It is known that magnesium may be prepared by the reduction of magnesia with calcium carbide, the theoretical reaction being exemplified by the equation (1)   $MgO + CaC_2 = Mg + CaO + 2C$ The reduction process is usually carried out at reduced pressure and the magnesium is formed as a vapor which may be withdrawn from the reaction zone and condensed. In order to obtain any substantial formation of magnesium according to this process, it is necessary to operate at temperatures above about 1300° C. However, when the reaction is carried out at these temperatures, there is a considerable tendency for the carbon formed in the process to attack unreacted magnesia, thereby forming carbon monoxide according to the equation (2)   $MgO + C = Mg + CO$ Unfortunately the presence of this carbon monoxide may seriously affect the quality and purity of the metallic magnesium obtained. For this reason the calcium carbide reduction of magnesia has never met with favor.

I have now found, however, that the reduction of magnesia by means of calcium carbide is catalyzed by the presence of a small proportion of a metal fluoride and in this way may satisfactorily be carried out at temperatures below 1300° C. When operating at these temperatures and in the presence of the catalyst, magnesium is obtained in high yield and in good state of purity. In addition heating costs are lowered and the slag formed in the process is not so hard as that otherwise obtained and hence is more easily handled.

In so far as I have been able to determine, any metal fluoride, e. g., aluminum fluoride ($AlF_3$) or barium silico-fluoride ($BaSiF_6$), is operable in the process of the invention. However, calcium fluoride ($CaF_2$), is greatly to be preferred, both because of its lower cost and more particularly because of its pronounced catalytic effect. The calcium fluoride or other catalyst is ordinarily employed in the proportion of between about 1 and about 15 per cent by weight of the total charge, 5 to 10 per cent being preferable. At temperatures below 1300° C. the fluoride is a true catalyst and does not act as a flux; the reaction mixture and residue remain solid at all times.

The process of the invention is applicable to the liberation of magnesium from any magnesia-containing raw material, such as calcined magnesite (MgO), calcined dolomite (MgO.CaO), and the like. In practice a charge is formed by mixing the magnesia ore, calcium carbide, and metal fluoride in proportions such that there is at least 1 mole of the carbide per mole of magnesia (usually 1.0 to 1.6 moles), and such that the fluoride represents not more than 15 per cent of the total weight. If desired, carbon may also be added to the charge for the purpose explained in my United States Patent No. 2,158,786. This charge is then fed into an electric vacuum furnace maintained at a temperature between about 1050° C. and about 1300° C. and preferably at an absolute pressure below about 10 mm. of mercury. The magnesium is evolved rapidly as a vapor which may be withdrawn from the furnace and condensed to metallic magnesium of good purity.

The following example is illustrative of the invention.

Example

A mixture of 100 parts by weight of calcined dolomite (200 mesh), 127 parts of 80 per cent calcium carbide (14–40 mesh), 19 parts of powdered fluorspar, and 26 parts of carbon was heated in an electric furnace at a temperature of 1100°–1150° C. at a pressure of 1–3 mm. of mercury for 7 hours. Magnesium vapors were liberated continuously during this period and were withdrawn from the furnace and condensed. There was obtained 24.5 parts of pure magnesium metal, a quantity corresponding to a 97 per cent yield.

The foregoing description is illustrative rather than strictly limitative, and it is to be understood that the invention is co-extensive in scope with the following claims.

I claim:

1. In a method of producing magnesium by the thermal reduction of magnesia-containing materials, the steps which comprise heating a charge mixture comprising a magnesia-containing material, calcium carbide, and a catalyst consisting of a metal fluoride, the carbide being employed in a proportion of at least 1 mole per mole of magnesia, and the fluoride being used in an amount of between about 1 and about 15 per cent by weight of the total charge, at a temperature between about 1050° and about 1300° C. and at an absolute pressure below 10 mm. of mercury, to vaporize magnesium therefrom, whereby fluxing of the mixture is avoided, and condensing the magnesium vapors formed.

2. In a method of producing magnesium by the thermal reduction of magnesia-containing materials, the steps which comprise heating a charge mixture comprising a magnesia-containing material, calcium carbide, and a catalyst consisting of calcium fluoride, the carbide being employed in a proportion of at least 1 mole per mole of magnesia, and the fluoride being used in an amount of between about 1 and about 15 per cent by weight of the total charge, at a temperature between about 1050° and about 1300° C. and at an absolute pressure below 10 mm. of mercury, to vaporize magnesium therefrom, whereby fluxing of the mixture is avoided, and condensing the magnesium vapors formed.

3. In a method of producing magnesium by the thermal reduction of magnesia-containing materials, the steps which comprise heating a charge mixture comprising a magnesia-containing material, calcium carbide, a catalyst consisting of a metal fluoride, and carbon, the carbide being employed in a proportion of at least 1 mole per mole of magnesia, and the fluoride being used in an amount of between about 1 and about 15 per cent by weight of the total charge, at a temperature between about 1050° and about 1300° C. and at an absolute pressure below 10 mm. of mercury, to vaporize magnesium therefrom, whereby fluxing of the mixture is avoided, and condensing the magnesium vapors formed.

4. In a method of producing magnesium by the thermal reduction of magnesia-containing material, the step which comprises heating a charge mixture comprising calcined dolomite, calcium carbide, a catalyst consisting of calcium fluoride, and carbon, the carbide being employed in the proportion of between about 1.0 and about 1.6 moles per mole of magnesia present in dolomite, and the fluoride being employed in an amount between about 5 and about 10 per cent by weight of the total charge, at a temperature between about 1050° and about 1300° C. and at an absolute pressure below 10 mm. of mercury, to vaporize magnesium therefrom, whereby fluxing of the mixture is avoided, and condensing the magnesium vapors formed.

5. In a method of producing magnesium by the thermal reduction of magnesia-containing materials with calcium carbide as reducing agent, the steps which comprise heating a charge mixture comprising a magnesia-containing material, calcium carbide and a catalyst consisting of a metal fluoride at a reaction temperature below about 1300° C. to vaporize magnesium therefrom, whereby fluxing of the mixture is avoided, and condensing the magnesium vapors formed.

6. In a method of producing magnesium by the thermal reduction of magnesia-containing materials with calcium carbide as reducing agent, the steps which comprise heating a charge mixture comprising a magnesia-containing material, calcium carbide and a catalyst consisting of calcium fluoride at a reaction temperature below about 1300° C. to vaporize magnesium therefrom, whereby fluxing of the mixture is avoided, and condensing the magnesium vapors formed.

ROY C. KIRK.